United States Patent
Wild et al.

(10) Patent No.: US 10,038,585 B2
(45) Date of Patent: Jul. 31, 2018

(54) RECEIVER AND RECEIVER METHOD FOR A FILTERED MULTICARRIER SIGNAL

(71) Applicant: Alcatel Lucent, Boulogne Billancourt (FR)

(72) Inventors: Thorsten Wild, Stuttgart (DE); Frank Schaich, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/913,757

(22) PCT Filed: Aug. 21, 2014

(86) PCT No.: PCT/EP2014/067820
§ 371 (c)(1),
(2) Date: Feb. 23, 2016

(87) PCT Pub. No.: WO2015/024994
PCT Pub. Date: Feb. 26, 2015

(65) Prior Publication Data
US 2016/0211999 A1    Jul. 21, 2016

(30) Foreign Application Priority Data
Aug. 23, 2013 (EP) .................................... 13306171

(51) Int. Cl.
*H04L 27/26* (2006.01)
*H04L 25/02* (2006.01)
*H04L 25/03* (2006.01)

(52) U.S. Cl.
CPC .......... *H04L 27/265* (2013.01); *H04L 25/022* (2013.01); *H04L 25/0204* (2013.01);
(Continued)

(58) Field of Classification Search
CPC ............. H04L 27/265; H04L 25/03891; H04L 27/264; H04L 27/2647; H04L 27/2601;
(Continued)

(56) References Cited

U.S. PATENT DOCUMENTS 7,310,304 B2    12/2007    Mody et al.
8,073,066 B2    12/2011    Kawauchi et al.
(Continued)

FOREIGN PATENT DOCUMENTS

CN    1229553 A    9/1999
CN    101199172 A    6/2008
(Continued)

OTHER PUBLICATIONS

Frank Schaich et al., "Waveform contenders for 5G—OFDM vs. FBMC vs UFMC," 2014 6th International Symposium on Communications, control and Signal Processing (ISCCSP), IEEE, pp. 457-460, XP032627152, 2014.
(Continued)

*Primary Examiner* — Betsy Deppe
(74) *Attorney, Agent, or Firm* — Fay Sharpe, LLP

(57) ABSTRACT

Embodiments relate to a receiver (310) for receiving a multicarrier signal. The multicarrier signal comprises a first frequency block with a first group of subcarriers, the first frequency block being filtered with a first frequency block specific sideband suppression filter (106-1) for sideband suppression outside of said first frequency block, and at least a second frequency block with at least a second group of subcarriers, the second frequency block being filtered with a second frequency block specific sideband suppression filter (106-2) for sideband suppression outside of said second frequency block. The receiver (310) comprises a filter
(Continued)

module (320) operable to perform an inverse sideband suppression filter operation for the first and at least the second frequency block.

10 Claims, 5 Drawing Sheets

(52) U.S. Cl.
CPC .... *H04L 25/0224* (2013.01); *H04L 25/03159* (2013.01); *H04L 25/03828* (2013.01); *H04L 25/03891* (2013.01); *H04L 27/264* (2013.01); *H04L 27/2647* (2013.01); *H04L 2025/03414* (2013.01)

(58) Field of Classification Search
CPC .............. H04L 27/2626; H04L 27/2628; H04L 27/263; H04L 27/2634; H04L 25/03828; H04L 25/03159; H04L 25/0224; H04L 25/0204; H04L 25/022; H04L 2025/03414
See application file for complete search history.

(56) References Cited

U.S. PATENT DOCUMENTS

| | | | |
|---|---|---|---|
| 8,126,070 | B2 | 2/2012 | Hyllander et al. |
| 8,170,064 | B2 | 5/2012 | Choi et al. |
| 8,265,561 | B2 | 9/2012 | Nakamura |
| 2001/0026602 | A1 | 10/2001 | Wiese et al. |
| 2001/0028692 | A1* | 10/2001 | Wiese ............... H04B 1/123 375/346 |
| 2007/0004337 | A1* | 1/2007 | Biswas ............. H04L 25/0204 455/63.1 |
| 2008/0192843 | A1* | 8/2008 | Tenny ............... H04L 25/0232 375/260 |
| 2012/0314750 | A1* | 12/2012 | Mehrabani ............ H04L 27/01 375/229 |
| 2013/0005282 | A1* | 1/2013 | Zhang ............... H04L 27/2634 455/114.2 |

FOREIGN PATENT DOCUMENTS

| | | |
|---|---|---|
| JP | 2001-151530 | 6/2001 |
| JP | 2008-125070 | 5/2008 |
| JP | 2009-111749 | 5/2009 |
| JP | 2009-225002 | 10/2009 |
| JP | 2010-124334 | 6/2010 |
| JP | 2010-232857 | 10/2010 |
| JP | 2012-503905 | 2/2012 |
| WO | WO 2012/168926 A2 | 12/2012 |
| WO | WO 2012/168926 A3 | 12/2012 |

OTHER PUBLICATIONS

Vida Vakilian et al., "Universal-Filtered Multi-Carrier Technique for Wireless Systems Beyond LTS," 2013 Globecom 2013 Workshop—Broadband Wireless Access, IEEE, pp. 223-228, XP032599957, 2013.

O. Jan et al., "An Experiment of Subband Spectral Shaping in DFT-Spread CO-OFDM Systems," 2013 18$^{th}$ OptoElectronics and Communications Conference Held Jointly with 2013 International Conference on Photonics in Switching, IEICE, pp. 1-2, XP032482271, 2013.

Yabo Li et al., "On Performance of Vector OFDM with Zero-Forcing Receiver," 2012 IEEE 11$^{th}$ International Conference on Signal Processing, IEEE, pp. 1506-1511, XP032353522, 2012.

Qinghua Shi et al., "Fractionally Spaced Frequency-Domain MMSE Receiver for OFDM Systems," IEEE Transactions on Vehicular Technology, vol. 59, No. 9, IEEE, pp. 4400-4407, XP011319120, 2010.

Yabo Li, et al., "On Performance of Vector OFDM with Zero-Forcing Receiver," ICSP 2012 Proceedings, pp. 1506-1511.

* cited by examiner

RECEIVER AND RECEIVER METHOD FOR A FILTERED MULTICARRIER SIGNAL

Embodiments of the present invention generally relate to communication systems and, more particularly, to communication systems employing multicarrier signals.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Every few years, wireless cellular communications got renewed. While the move to $2^{nd}$ Generation (2G) has been technology driven, i.e., the switch to digital signal processing, the switch to 3G (data, internet access) and 4G (video) have been service driven to a high extend. The achievable data rates have grown significantly starting from few kbit/s (beginnings of the Global System for Mobile Communications, GSM) up to a few hundreds of kbit/s (Enhanced Data rates for GSM Evolution, EDGE) for 2G. The beginnings of 3G have reached several hundreds of kbit/s increasing up to 42 Mbit/s (at least theoretically) with High-Speed Downlink Packet Access (HSDPA) the newest incarnation of 3G. Actually 4G is rolled out achieving up to a few hundreds of Mbit/s (Long-Term Evolution, LTE) using multicarrier techniques, with its evolution LTE advanced at the horizon approaching the Gbit/s region.

Multicarrier signal formats offer a large amount of flexibility. This flexibility is very attractive when aiming at a scalable radio frame structure. There is also a natural, physical explanation why multicarrier signal formats are desirable. Wireless propagation channels are linear and—approximately over the duration of one multicarrier symbol—time-invariant (LTI). LTI systems preserve sinusoids as eigenfunctions. Sinusoids are one basic building block of multicarrier modulated signals. This leads to nice properties when it comes to demodulation and equalization.

One significant drawback of multicarrier modulation is the Peak-to-Average Power Ratio (PAPR), but there are methods like Discrete Fourier Transform (DFT) precoding used in conjunction with Orthogonal Frequency Division Multiplexing (OFDM) to build up Single-Carrier Frequency Division Multiplexing (SC-FDMA), out of multicarrier signals, which brings down PAPR.

OFDM is today's dominant multicarrier technology. Its Cyclic Prefix (CP) allows transforming the linear convolution of the channel into a cyclic convolution, thus deals very elegantly with multi-path propagation, at the price of additional overhead of the CP, typically ranging from 5-25%. As long OFDM is used in a fully time- and frequency synchronous manner this is very attractive.

5G systems will bring along new device classes and new traffic types, e.g., driven from the Internet of Things (IoT). Relaxing synchronicity will allow for reducing a painful overhead for massive numbers of machines. Technologies like Autonomous Timing Advance (ATA) can be used. ATA here means an open-loop timing control approach, where a mobile terminal synchronizes itself on a downlink receive signal, e.g. using pilot symbols and/or synchronization sequences and corrects its timing autonomously, e.g. based on knowledge of supported cell sizes, etc. Additionally, low-end devices can be made cheaper when e.g. oscillator requirements can be relaxed, which are very strict for e.g. LTE. On top, the trend towards higher carrier frequencies, like millimeter waves, causes that the same relative Carrier Frequency Oscillator (CFO) requirements will lead to much larger absolute frequency shifts, phase jitters etc. observed in the baseband processing.

The demand for increased robustness and for relaxation of strict time- and frequency alignments does not go together well with OFDM. In the OFDMA uplink, when devices allocated to neighboring frequencies have timing- and frequency offsets, orthogonality is lost and Inter-Carrier Interference (ICI) is generated, reducing the overall system performance. Due to the rectangular-windowed time domain shape of OFDM symbols, the subcarrier spectrum is formed of sinc-functions which have comparatively high side lobe levels. Only with strict time- and frequency alignments, OFDM can be attractive when the nulls of the spectral subcarrier levels fall together with the maxima of other subcarriers.

Existing multicarrier alternatives to OFDM aim at reduced spectral side-lobe levels, making them more attractive for e.g. uplink FDMA with asynchronous users and operation in fragmented spectrum. Filter-Bank based Multi-Carrier (FBMC) is using additional per-subcarrier pulse-shaping filters, typically with a length of more than one multi-carrier symbol. Those filters provide very strong side-lobe suppression and can be implemented efficiently in poly-phase filter-banks. The CP overhead can be avoided. Due to the long filter lengths, FBMC is best used in conjunction with offset-QAM (OQAM) with subsequent symbols overlapping, but being orthogonalized by using real and imaginary part of the symbol alternately. Drawbacks of FBMC are that—due to OQAM—it is e.g. not compatible to all kinds of Multiple Input Multiple Output (MIMO). Furthermore, the long filter lengths make short burst inefficient, due to filter "ramp up" and "ramp down" time. Short bursts will be important for energy-efficient Machine Type Communication (MTC). Here, another existing multicarrier signal format hooks in: Generalized Frequency Division Multiplexing (GFDM). It is similar to FBMC with subcarrier-wise pulse shaping, but uses methods like tail biting (circular convolution with the filters instead of linear convolution) to be attractive for short bursts. Its drawbacks are overlapping subcarriers and thus usually comparatively complex receivers. Filtered OFDM, thus filtering OFDM over the entire band, is known and used for some time to reduce out-of band radiation.

It is desirable to provide more multicarrier alternatives to OFDM.

SUMMARY

Some simplifications may be made in the following summary, which is intended to highlight and introduce some aspects of the various exemplary embodiments, but such simplifications are not intended to limit the scope of the inventions. Detailed descriptions of preferred exemplary embodiments adequate to allow those of ordinary skill in the art to make and use the inventive concepts will follow in later sections.

Embodiments propose a receiver scheme for a novel multicarrier signal format, which will be referred to as Universal Filtered Multi-Carrier (UFMC) throughout this specification. UFMC can be interpreted as a generalization of FBMC and filtered OFDM. While the former filters each subcarrier and the latter filters the entire band, UFMC filters blocks of multiple subcarriers.

Hence, embodiments provide a receiver corresponding to a transmitter for conditioning a multicarrier signal (UFMC signal). The corresponding transmitter includes means for grouping subcarriers of the multicarrier signal into a first frequency block which contains a first group of said subcarriers, and into at least a second frequency block which contains at least a second group of said subcarriers. The transmitter further includes first filtering means for sideband suppression outside of the first frequency block. The first filtering means is configured to provide multicarrier symbols of the first frequency block with temporally soft transitions on each subcarrier of the first subcarrier group. The transmitter further includes at least second filtering means for simultaneous and separate sideband suppression outside of the at least second frequency block. The second filtering means is configured to provide multicarrier symbols of the second frequency block with temporally soft transitions on each subcarrier of the second subcarrier group. In radio communications, a sideband is a band of frequencies higher than or lower than the carrier or center frequency, containing power as a result of the modulation process. The side-bands consist of all the Fourier components of the modulated signal except the carrier or center frequency. Sidebands of the first frequency block can interfere with adjacent channels, e.g. the second frequency block. The part of the first frequency block's side-band that would overlap the neighboring channel is suppressed by the first filtering means. The same holds for the second frequency block's sideband.

Correspondingly, embodiments of the receiver serve for receiving said (UFMC) multi-carrier signal. The received multicarrier signal comprises the first frequency block. The first frequency block comprises the first group of subcarriers. At the transmitter, the first frequency block has been filtered with a first frequency block specific sideband suppression filter for sideband suppression outside of said first frequency block. Hence, the filtered first frequency block comprises multicarrier symbols with temporally soft transitions on each subcarrier of the first subcarrier group. Further, the multicarrier signal comprises at least the second frequency block. The second frequency block comprises a second group of subcarriers. At the transmitter, the second frequency block has been filtered with a second frequency block specific sideband suppression filter for sideband suppression outside of said second frequency block. Hence, the filtered second frequency block comprises multicarrier symbols with temporally soft transitions on each subcarrier of the second subcarrier group. In embodiments the receiver includes a filter module which is operable or configured to perform an inverse (or reverse) sideband suppression filter operation for the first and at least the second frequency block included in the received multicarrier signal. Thereby, "inverse" may be understood such that the receiver's filter module, hence its impulse response(s), is adapted or matched to the transmitter's first and second sideband suppression filtering means.

In other words, it is provided a receiver for a multicarrier signal. The receiver comprises a filter module which is configured to perform an inverse sideband suppression filter operation for a first frequency block of the multicarrier signal. The first frequency block comprising a first group of subcarriers. The first frequency block has been filtered with a first frequency block specific sideband suppression filter for sideband suppression outside of said first frequency block. The filtered first frequency block comprises multicarrier symbols with temporally soft transitions on each subcarrier of the first group. Further, the filter module is configured to perform an inverse sideband suppression filter operation for at least a second frequency block of the multicarrier signal. The second frequency block comprises a second group of subcarriers. The second frequency block has been filtered with a second frequency block specific sideband suppression filter for sideband suppression outside of said second frequency block. The filtered second frequency block comprises multicarrier symbols with temporally soft transitions on each subcarrier of the second group.

According to a further aspect, it is also provided a multicarrier communication system. The system comprise a transmitter. The transmitter includes means for grouping subcarriers of a multicarrier signal into a first frequency block containing a first group of said subcarriers, and into at least a second frequency block containing at least a second group of said subcarriers. The transmitter further includes a first filter for sideband suppression outside of the first frequency block. The first filter is configured to provide multicarrier symbols of the first frequency block with temporally soft transitions on each subcarrier of the first group. The transmitter also includes at least a second filter for simultaneous and separate sideband suppression outside of the at least second frequency block. The second filter is configured to provide multicarrier symbols of the second frequency block with temporally soft transitions on each subcarrier of the second group. The system also comprises a receiver which includes a filter module configured to perform an inverse sideband suppression filter operation for the first and at least the second frequency block.

In embodiments, the receiver's filter module may correspond to any filtering unit, filter unit, radio frequency filter, etc. Hence, in embodiments the filter module may contain an input for the received multicarrier signal or a part thereof, which contains the first and at least the second frequency block, an algorithm, which filters the signal with filter characteristics, which are adapted to frequency positions of the first and at least the second frequency block, respectively, and an output for the filtered signal. In some embodiments the filter module can be implemented in terms of a computer program and/or a hardware component on which the computer program is executed, such as a DSP, an ASIC, an FPGA or any other processor.

In one or more embodiments the receiver's filter module may comprise one or more linear filters. Linear filters process time-varying input signals to produce output signals, subject to the constraint of linearity. Thereby the receiver's one or more linear filters may depend on a transmission channel between the UFMC transmitter and the receiver. In embodiments the transmission channel may correspond to a concatenation of one or more Inverse Discrete Fourier Transforms (IDFT) performed to obtain the multicarrier signal at the transmitter, one or more the sideband suppression filters at the transmitter for the first and/or at least the second frequency block, and a physical communication channel between the transmitter and the receiver. In embodiments the physical communication channel may be a wireless fading channel, for example. The one or more linear filters may be represented by one or more filter coefficient matrices, which may be applied to a received signal vector representing the multicarrier signal.

For example, the one or more linear filters may be one of the group consisting of a matched filter, a Zero-Forcing (ZF) filter, and a Minimum Mean Squared Error (MMSE) filter. In signal processing, a matched filter is obtained by correlating a known signal, or template, with an unknown signal (received multicarrier signal) to detect the presence of the template in the unknown signal. This is equivalent to convolving the unknown signal with a conjugated time-reversed version of the template (i.e., sideband suppression filter). A Zero Forcing filter refers to a form of linear filtering algorithm used in communication systems which applies the inverse of the frequency response of the transmission channel. A MMSE filter minimizes the Mean Square Error (MSE) of the fitted values of a dependent variable, which is a common measure of estimator quality.

Optionally, the receiver's filter module may be coupled to or included in a non-linear Maximum Likelihood (ML) detector for detecting a first transmit signal of the first frequency block based on (the received multicarrier signal and) a plurality of filtered hypothesis of the first transmit signal and/or for detecting a second transmit signal of the second frequency block based on (the received multicarrier signal and) a plurality of filtered hypothesis of the second transmit signal. Here, also filtered hypothesis of signals belonging to subcarriers neighboring the frequency block of interest may be considered, depending on the steepness of the edges of the sideband suppression filters of the first and/or the second frequency block.

In some embodiments the non-linear maximum likelihood detector may be configured to successively operate on different "inversely" or "reversely" sideband suppression filtered frequency blocks of the received multicarrier signal in order to reduce receiver complexity.

In one or more embodiments the receiver may comprise a Fourier transform module which is configured to transform the received multicarrier signal from the time-domain into the frequency-domain. In embodiments, the Fourier transform module may correspond to any performing unit, execution unit, processing unit, etc. Hence, in embodiments, the Fourier transform module may contain an input for the received time-domain multicarrier signal comprising the first frequency block and the at least second frequency block, an algorithm, which performs the Fourier transformation and an output for the frequency-domain signal. In some embodiments performing the Fourier transformation can be implemented in terms of a computer program and a hardware component on which the computer program is executed, such as a DSP, an ASIC, an FPGA or any other processor.

Hence, the receiver's filter module may be configured to perform the inverse sideband suppression filter operation (or at least parts thereof) for the first and the at least second frequency block in the frequency domain. For that purpose the receiver may be configured to append N−L+1 zeros to a received time-domain multicarrier signal vector of length N+L−1, with N denoting the length of an Inverse Discrete Fourier Transform (DFT) performed at the transmitter of the multicarrier signal and L denoting a length of a sideband suppression filter at the transmitter. In embodiments the receiver's Fourier transform module may be configured to perform a Fast Fourier Transform (FFT) on the appended time-domain multicarrier signal vector corresponding to a length of 2N and, after the Fast Fourier Transform, to discard every second sample of the obtained frequency-domain signal vector.

Optionally, the receiver's filter module may comprise a per-subcarrier equalization filter for equalizing, in the frequency domain and per subcarrier, an overall transmission channel between the transmitter and the receiver. The overall transmission channel may correspond to a concatenation of a (transmit side) sideband suppression filter operation for the respective frequency or subcarrier block and a physical communication channel for the respective subcarrier between the transmitter and the receiver.

In some embodiments the receiver's filter module may be configured to separately filter the received multicarrier signal according to the inverse sideband suppression filter operation for the first frequency block and according to the inverse sideband suppression filter operation of the at least second frequency block in the time domain to obtain first and second filtered multicarrier signals. The receiver may comprise a Fourier transform module which is configured to separately transform the first and second filtered multicarrier signals into the frequency domain and to discard subcarriers outside the respective frequency block of interest for further processing.

Optionally the receiver may comprise an interference suppression module which is operable or configured to apply a window-function to the received multicarrier signal in the time domain before performing the (at least partially) inverse sideband suppression filter operation for the first and/or at least the second frequency block. Thereby a window function may be understood as a mathematical function that is zero-valued outside of some chosen interval. For instance, a function that is constant inside the interval and zero elsewhere is called a rectangular window. When another function or waveform/data-sequence is multiplied by a window function, the product is also zero-valued outside the interval: all that is left is the part where they overlap; the "view through the window". In typical applications, the window functions used are non-negative smooth "bell-shaped" curves, though rectangle, triangle, and other functions can be used as well.

In one or more embodiments the receiver may comprise an interference cancellation module which is operable or configured to estimate a transmitted signal corresponding to a multicarrier signal (or a part thereof) of an adjacent frequency band and to use the estimated signal for interference cancellation in the multicarrier signal (or a part thereof) in the frequency band of interest. In such embodiments Multi-User Detection (MUD) techniques may be employed, for example.

Optionally the receiver may include means for decoding multiple signal layers in the received and filtered first and second frequency block. Thereby, the multiple signal layers may correspond to different Code Division Multiple Access (CDMA) or Interleave Division Multiple Access (IDMA) layers employed in the subcarriers of the first and/or second frequency block of the UFMC multicarrier signal.

In some embodiments the receiver may comprise a channel estimator which is operable or configured to determine a subcarrier-specific estimate of a physical communication channel between the transmitter and the receiver. The subcarrier-specific channel estimate may be determined based on a Fourier transformation of one or more known pilot signals comprised in the multicarrier signal, and based on the sideband suppression filter for the frequency block comprising the respective subcarrier. Hence, for channel estimation, an idea is to find a frequency domain representation of the receive signal, to compensate the UFMC filter frequency response in addition to the pilot symbol amplitude and to process this first raw channel estimates with all the available channel estimator families known from e.g. OFDM.

According to a further aspect, embodiments also provide a method for receiving a (UFMC) multicarrier signal. The multicarrier signal comprises a first frequency block including a first group of subcarriers, the first frequency block being filtered with a first frequency block specific sideband suppression filter for sideband suppression outside of said first frequency block. Further, the multicarrier signal comprises at least a second frequency block including at least a second group of subcarriers, the second frequency block being filtered with a second frequency block specific sideband suppression filter for sideband suppression outside of said second frequency block. The method comprises performing an at least partially inverse sideband suppression filter operation for the first and at least the second frequency block.

In other words, the method includes performing an inverse sideband suppression filter operation for a first frequency block of the multicarrier signal. The first frequency block comprises a first group of subcarriers. The first frequency block has been filtered with a first frequency block specific sideband suppression filter for sideband suppression outside of said first frequency block. The filtered first frequency block comprises multicarrier symbols with temporally soft transitions on each subcarrier of the first group. Further, the method includes performing an inverse sideband suppression filter operation for at least a second frequency block of the multicarrier signal. The second frequency block comprises at least a second group of subcarriers. The second frequency block has been filtered with a second frequency block specific sideband suppression filter for sideband suppression outside of said second frequency block. The filtered second frequency block comprises multicarrier symbols with temporally soft transitions on each subcarrier of the second group.

Some embodiments comprise digital circuitry installed within the transmitters/receivers for performing the respective methods. Such a digital control circuitry, e.g., a digital signal processor (DSP), a Field-Programmable Gate Array (FPGA), an Application-Specific Integrated Circuit (ASIC), or a general purpose processor, needs to be programmed accordingly. Hence, yet further embodiments also provide a computer program having a program code for performing embodiments of the method, when the computer program is executed on a computer or a programmable hardware device.

Hence, embodiments provide several different flexible and scalable receiver chain realizations for demodulating an UFMC signal. Those receiver chains (with their sub-variants) can cover many attractive approaches for UFMC signal reception. Thereby, the proposed receivers include pure time-domain processing: Linear and non-linear. Their complexity makes them particularly attractive for small numbers of subcarriers. Embodiments also provide pure frequency domain receiver processing, which may achieve a complexity almost as low as OFDM. Further, embodiments include time-domain pre-processing, followed by frequency-domain processing, which may offer additional performance gains compared to pure frequency domain processing, with modest increase in complexity.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
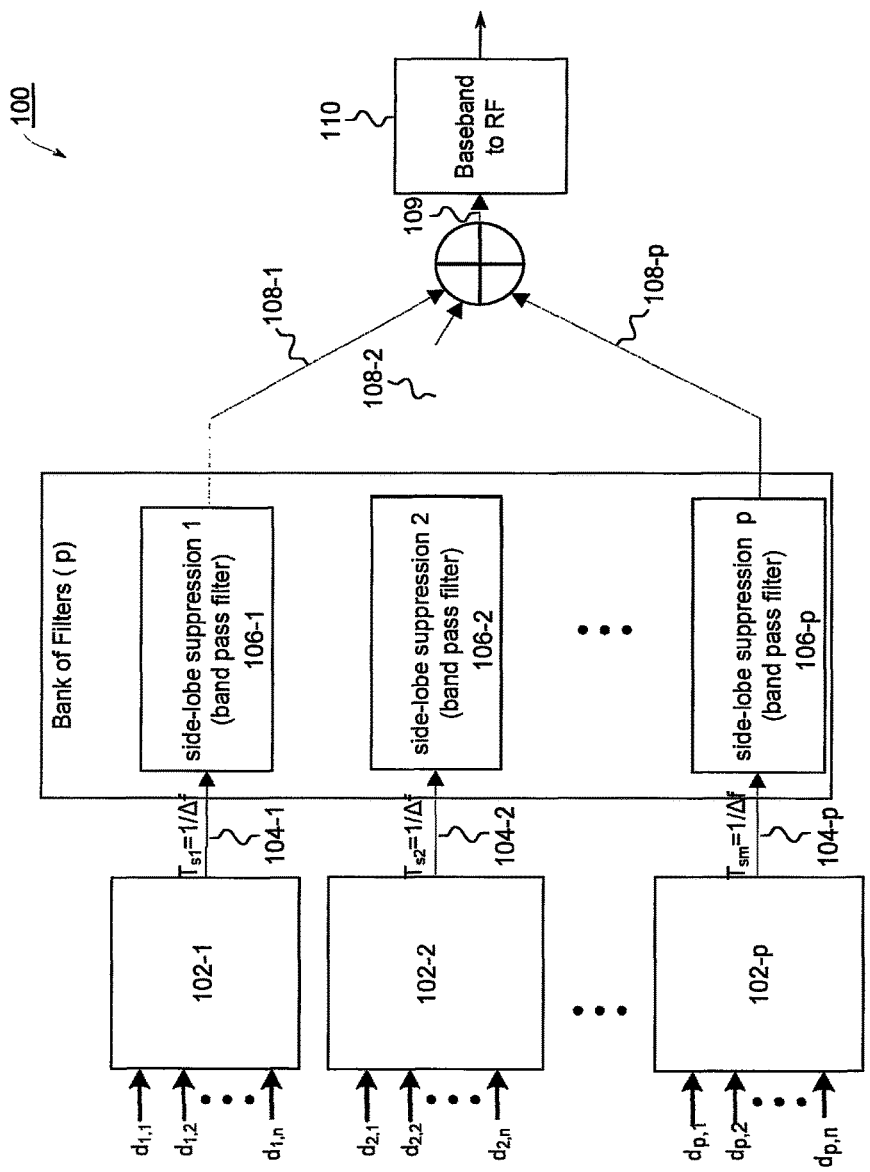
FIG. 1 illustrates a block diagram of an exemplary UFMC transmitter.

FIG. 1 schematically illustrates a block diagram of an exemplary transmitter 100 for conditioning an UFMC multicarrier signal according to an embodiment.

The exemplary UFMC transmitter 100 is characterized by a frequency block-wise IDFT (IDFT=Inverse Discrete Fourier Transformation). That is to say, data symbols $d_{i,j}$ (i=1 . . . p; j=1 . . . n) are modulated onto p groups (or frequency blocks) each comprising n subcarriers. Note that the number of subcarriers per frequency block (also referred to as subband) may deviate from each other. Each frequency block i is converted from frequency-domain to time-domain by a frequency block specific IDFT module 102-1, 102-2, ..., 102-p to obtain p time-domain signals 104-1, 104-2, ..., 104-p which are then individually filtered by frequency block specific side-lobe suppression (band pass) filters 106-1, 106-2, ..., 106-p. The filtered time domain signals 108-1, 108-2, ..., 108-p are then combined to the UFMC multicarrier signal 109 and converted from baseband to Radio Frequency (RF) domain. Note that the splitting of processing functions across processing units shown in FIG. 1 is not critical, and, as can be understood by those skilled in the art, the number of processing units, the number of processing functions and an allocation of the processing functions to the processing units may vary without departing from the scope of embodiments.

The processing functions of the exemplary transmitter 100 may be split into a first group of processing units 102-1, 102-2, ..., 102-p and a second group of band pass filters 106-1, 106-2, ..., 106-p. A mathematical description of a transmitted complex-valued time-domain signal vector X may be given, for example, by following equation:

$$X = \sum_{i=1}^{p} F_i V_i d_i \quad (1)$$

with
p: number of frequency blocks (such as a number of LTE PRBs),
$F_i$: so-called Toeplitz matrix for number i of the frequency blocks, which contains a bandpass FIR filter (FIR=Finite Impulse Response) for filtering the number i of the frequency blocks,
$V_i$: complex-valued matrix for number i of the frequency blocks for applying an IDFT and for a mapping of the data symbol vector $d_i$ for example onto sinusoidal subcarriers,
$d_i$: data symbol vector for number i of the p frequency blocks (subbands).

According to FIG. 1, a first data symbol vector $d_1$ comprising $n_1$ data symbols $d_{1,j}$ (j=1 ... $n_1$) is applied to a first one 102-1 of a group of IDFT processing units 102-1, 102-2, ..., 102-p for performing a first IDFT on the first symbol vector $d_1$. The IDFT may include interpolation and up-conversion by choosing respective IDFT vectors appropriately in terms of length and phase rotations. The IDFT processing unit 102-1 generates a first time domain signal 104-1, which contains a plurality of subcarriers forming a first frequency block. The IDFT may have a dimension of $n_1 \times N$, with $n_1$ being a number of subcarriers to be modulated for the first frequency block, and N being equal to a total number of subcarriers theoretically fitting for a predefined subcarrier distance into a whole predefined frequency range (band), when the whole predefined frequency range would be occupied by subcarriers. In a same way, the data symbol vectors $d_2$, ..., $d_p$ may be applied to corresponding further IDFT processing units 102-2, ..., 102-p for performing further IDFTs including interpolation and up-conversion and for generating further time domain signals 104-2, ..., 104-p, which each contain the frequency blocks of subcarriers. The processing units 102-1, 102-2, ..., 102-p enable a separate inverse Fourier transformation for each frequency block, which could be a subband or a subset of a subband. That is to say, for each frequency block or subband, indexed i, $n_i$ complex Quadrature Amplitude Modulation (QAM) data symbols $d_{i,j}$ (i=1 ... p; j=1 ... $n_i$) may be transformed to time-domain using the IDFT-matrix $V_i$. Thereby $V_i$ may be of dimension $N \times n_i$ and include the relevant columns of the inverse Fourier matrix according to the respective sub-band position within the overall available frequency range.

The first time domain signal 104-1 is provided to a first one 106-1 of the group of band pass filters 106-1, 106-2, ..., 106-p, which generates a first filtered time domain signal 108-1 corresponding to the first frequency or subcarrier block including $n_1$ subcarriers. A bandwidth of the first band pass filter 106-1 may be adapted so that the first band pass filter 106-1 is able to block and attenuate all frequency components outside a frequency range of the first frequency block. In a similar way, the further time domain signals 104-2, ..., 104-p may be provided to corresponding further band pass filters 106-2, ..., 106-p for generating the further filtered time domain signals 108-2, ..., 108-p. The band pass filters 106-i (i=1,..., p) may each be represented by a Toeplitz matrix F, composed of the respective filter impulse response, enabling the convolution.

The filtered time domain signals 108-1, 108-2, ..., 108-p may be provided to a back end processing unit 110 which may be configured to perform a baseband to RF conversion of the combined filtered time domain signals 108-2, ..., 108-p.

The UFMC transmit signal has a time domain characteristic in that the filters generate multi-carrier symbols with a soft energy ramp-up and ramp-down, according to equation (1). The subsequent multi-carrier symbol again starts with ramp-up and ends with a ramp-down. Hence, a rectangular pulse on each subcarrier of an OFDMA system is replaced by a pulse with soft transitions leading to filters having a shorter length in time domain and consequently a shorter symbol rate. The frequency-block-wise filtering of UFMC brings in additional flexibility and may be used to avoid FBMC drawbacks. The filtering per block of subcarriers (e.g. "physical resource block" or "subband" in the LTE terminology) may result in band-pass filters 106-i (i=1, ..., p) which are spectrally broader in pass-band than FBMC and thus shorter in time. This shortened time can be used to bring down the filter length e.g. in the order of the OFDM cyclic prefix (CP). Short bursts may be supported well with that, as well as operation in fragmented bands. Side-lobe suppression now works in between resource (frequency) blocks, instead in between subcarriers. The filter ramp-up and ramp-down in time domain may provide a symbol shape which has inherent soft protection against inter-symbol interference (ISI), as well as robustness for supporting multiple access users which are not perfectly time-aligned, as e.g. with ATA.

Figure 2A:
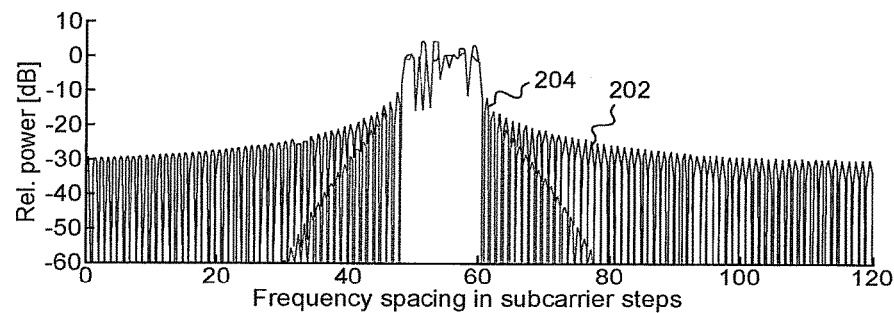
FIG. 2*a* shows comparison of spectra related to a single frequency block for OFDM and UFMC.

FIG. 2a illustrates a comparison of the spectrum of a single Physical Resource Block (PRB) or frequency block between OFDM (see reference numeral 202) versus the proposed UFMC signal format (see reference numeral 204). The reduction of the side-lobe levels is apparent.

Figure 2B:
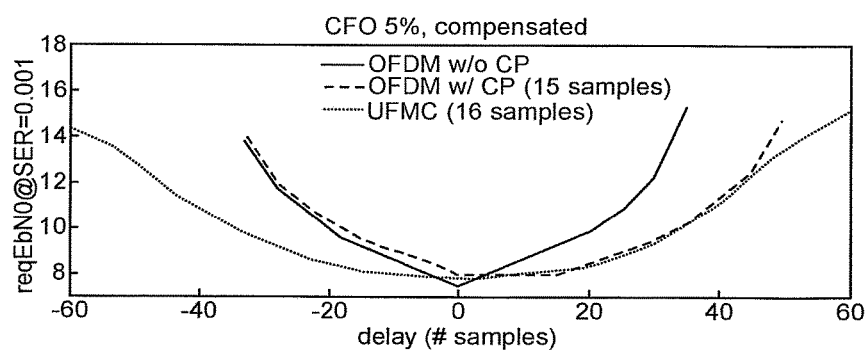
FIG. 2*b* illustrates performance results for OFDM compared to UFMC.

FIG. 2b shows performance results for comparison of UFMC with OFDM, with and without cyclic prefix (CP), under different timing offsets between different users. It is illustrated a two-user adjacent channel interference scenario in an AWGN channel. In particular, FIG. 2b shows the required $E_b/N_0$ to achieve a Quadrature Phase-Shift Keying (QPSK) symbol error rate of $10^{-3}$ as a function of adjacent user time delay in samples. The selected UFMC filter lengths of the filters 106-i (i=1, ..., p) are identical to CP. A multicarrier symbol duration corresponds to 128 samples (plus CP (0 or 15) and filter length—1 (15), respectively). The CFO is normalized to the subcarrier spacing. The person skilled in the art of communication systems will appreciate that UFMC may be spectrally more efficient than OFDM, due to the possibility to reduce guard bands, and to avoid using a CP which is discarded later on in the receiver.

In the following, some exemplary receiver structures for receiving a multicarrier signal with filtered frequency blocks or subbands according to the UFMC concept will be explained in more detail.

Figure 3:
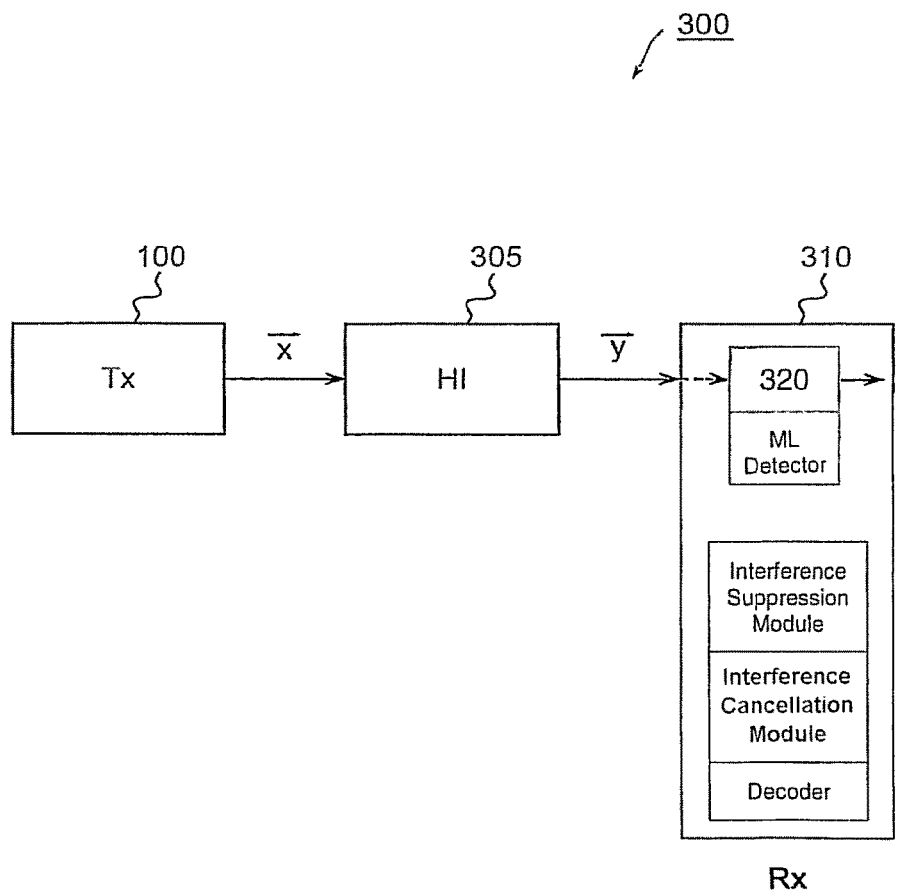
FIG. 3 shows a schematic block diagram of an UFMC communication system.

FIG. 3 schematically illustrates a communication system 300 comprising the transmitter 100 for the UFMC signal x and a corresponding receiver 310.

The transmitted UFMC signal x including the filtered frequency or subcarrier blocks travels from the transmitter 100 to the receiver 310 via a physical communication channel 305, which may be a wireless fading channel in some embodiments. The physical communication channel 305 may be modeled as a complex-valued matrix H comprising complex-valued fading coefficients and Additive White Gaussian Noise (AWGN) terms for each frequency block or subband of the multicarrier signal x. As has been described above, the multicarrier signal x comprises a first frequency block comprising a first group of subcarriers, wherein the first frequency block has been filtered with a first frequency block specific sideband suppression filter 106-1 for sideband suppression outside of said first frequency block. Further, the multicarrier signal comprises at least a second frequency block comprising at least a second group of subcarriers, wherein the second frequency block has been filtered with a second frequency block specific sideband suppression filter 106-i (i=2, . . . , p ) for sideband suppression outside of said second frequency block.

According to embodiments, the receiver 310 for the multicarrier signal x comprises a filter module 320 which is operable to perform an inverse sideband suppression filter operation for the first and the at least second frequency block comprised by the received multicarrier signal. Here, the expression "inverse" may be understood as a receive filter operation which is at least partially adapted or matched to the transmit filter operation of the frequency block specific sideband suppression filters 106-i (i=1, . . . , p ).

The aforementioned equation (1) can be rewritten without the summation by the following definitions:

$$\overline{F}=[F_1,F_2,\ldots,F_p]$$

$$\overline{V}=\text{diag}(V_1,V_2,\ldots,V_p)$$

$$\overline{s}=[d_1^T,d_2^T,\ldots,d_p^T]^T$$

This enables column-wise stacking of filter matrices, generating a block-diagonal IDFT matrix $\overline{V}$ and stacking of all data symbols data symbols $d_{i,j}$ (i=1 . . . p; j=1 . . . $n_r$) into one column, respectively. This results in the following baseband representation of the transmitted UFMC multicarrier signal $$x=\overline{F}\overline{V}\overline{s} \qquad (2)$$

leading to the following baseband representation of the received UFMC multicarrier signal:

$$y=Hx+n=H\overline{F}\overline{V}\overline{s}+n, \qquad (3)$$

wherein y denotes the received multicarrier signal vector after propagation through the physical communication channel 305, represented by the convolution matrix H with Toeplitz structure, constructed by the time-domain channel impulse response, including the addition of complex Gaussian noise n, with variance $\sigma_n^2$.

Various embodiments of the UFMC receiver 310 are possible, which will be explained in more detail below.

According to a first exemplary embodiment, the receiver's filter module 320 comprises a linear filter. A resulting linear time domain receiver 310 or the filter module 320 thereof may apply a filter weight matrix W to the time domain receive vector y in order to obtain the data symbol estimates. Mathematically this may be expressed as $$\hat{s}=Wy. \qquad (4)$$

The filter weight matrix W may have a number of lines corresponding to the amount N of possible subcarriers in the system bandwidth and it may have a number of columns corresponding to the length of the (inverse) Fourier transform plus the transmit sideband suppression filter length. In embodiments the linear filter W may depend on an overall transmission channel between the transmitter 100 and the receiver 310. The overall transmission channel may correspond to a concatenation of the respective IDFTs 102-1, 102-2, . . . , 102-p at the transmitter 100, the respective sideband suppression filters 106-1, 106-2, . . . , 106-p at the transmitter for the first and/or at least the second frequency block, and the physical communication 305 channel between the UFMC transmitter 100 and the UFMC receiver 310.

In some embodiments the receiver's linear filter matrix W may be a Matched Filter (MF) matrix. This MF matrix can be expressed as $$w_{MF}=(H\overline{F}\overline{V})^H=\overline{V}^H\overline{F}^HH^H. \qquad (5)$$

Figure 4:
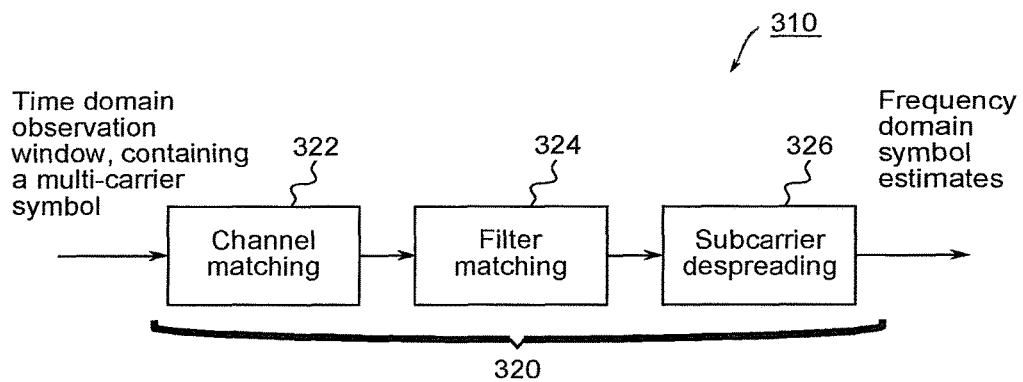
FIG. 4 illustrates a schematic block diagram of a linear UFMC receiver.

As it is schematically shown in FIG. 4, the receiver's linear filter operation expressed by equation (5) can be viewed as a concatenation of channel matching 322, inverse subcarrier-block-filtering 324, and DFT despreading 326.

Alternatively, in some embodiments the receiver's filter matrix W may be a Zero Forcing (ZF) filter matrix. The ZF filter can be expressed as $$w_{ZF}=(H\overline{F}\overline{V})^+=\overline{V}^+\overline{F}^+H^+ \qquad (6)$$

with $A^+$ denoting the Moore-Penrose-Inverse of a matrix A. As above, receiver decoupling into three subsequent stages is possible.

Alternatively, in some embodiments the receiver's filter matrix W may be a MMSE/Wiener filter matrix. The MMSE filter can be written as $$w_{MMSE}=(H\overline{F}\overline{V}\overline{V}^+\overline{F}^+H^++\sigma_n^2I)^{-1}\overline{V}^+\overline{F}^+H^+ \qquad (7)$$

The complexity of the linear receivers according to equations (5)-(7) depends on the number of subcarriers. However, they offer the possibility to deal also with Inter-Carrier Interference (ICI).

Further embodiments of the receiver 310 also include non-linear time domain receivers. In such embodiments the filter module 320 may be coupled to or included in a non-linear Maximum Likelihood (ML) detector. Here, the ML detector may detect a first transmit signal $d_1$ of the first frequency block based on a plurality of filtered hypothesis of the first transmit signal. Likewise, the ML detector may detect a second transmit signal $d_2$ of the at least second frequency block based on a plurality of filtered hypothesis of the second transmit signal. That is to say, a non-linear time domain receiver 310 may test out all possible symbol hypotheses $\tilde{d}_k$, indexed k, mapped to the different subcarriers, computes the resulting k-th receive time domain signal hypothesis $\tilde{y}_k=H\overline{F}\overline{V}\tilde{d}_k$ and may find the hypothesis which minimizes the Euclidean distance to the actual received signal $y_k$, e.g. according to:

$$\underset{k}{\operatorname{argmin}}(\|y - \tilde{y}_k\|_2) \qquad (8)$$

The hypothesis with minimum distance is the symbol estimate, corresponding to the Maximum Likelihood solution.

Depending on the number of subcarriers, the non-linear time domain receiver according to equation (8) can be quite complex. Therefore, in some embodiments the non-linear time domain receiver may operate subband-wise. That is to say, the non-linear maximum likelihood detector may be configured to successively operate on different inverse sideband suppression filtered frequency blocks of the received multicarrier signal y. The dimension of the search space may be reduced by appropriate pre-filtering. This pre-filtering may be carried out by applying a convolution with the reversed conjugate filter impulse response, a filter described by a Toeplitz matrix G carrying out the linear convolution, which may matched to the respective per-subband band-pass filter 106-i (i=1, . . . , p) of UFMC. Note that for the sake of readability there is no index written at G, but it is a subband-individual filter, which changes from subband to subband. For example, for the first frequency block or subband G may correspond to $F_1^H$, for the second subband G may correspond to $F_2^H$, etc.

As it may be seen from the spectrum 204 plotted in FIG. 2a, the side-lobe levels decay fast for UFMC. For the search, we thus have only to evaluate the possible symbol constellations within the subband k of interest and for a few neighbored subcarriers on each side of the considered (sub-)band k. The hypotheses are indexed with $\bar{k}$ and the search is:

$$\underset{\bar{k}}{\operatorname{argmin}}(\|Gy - G\tilde{y}_{\bar{k}}\|_2) \qquad (9)$$

Complexity reduction here means instead of search over all (e.g. N=600) subcarriers (which is infeasible in most cases), we may start several parallel searches (e.g. 50) over the subbands (e.g. each including 12 subcarriers) plus neighbor carriers (e.g. 12+2*3) which might still high complex, but strongly reduces the number of computations.

Figure 5:
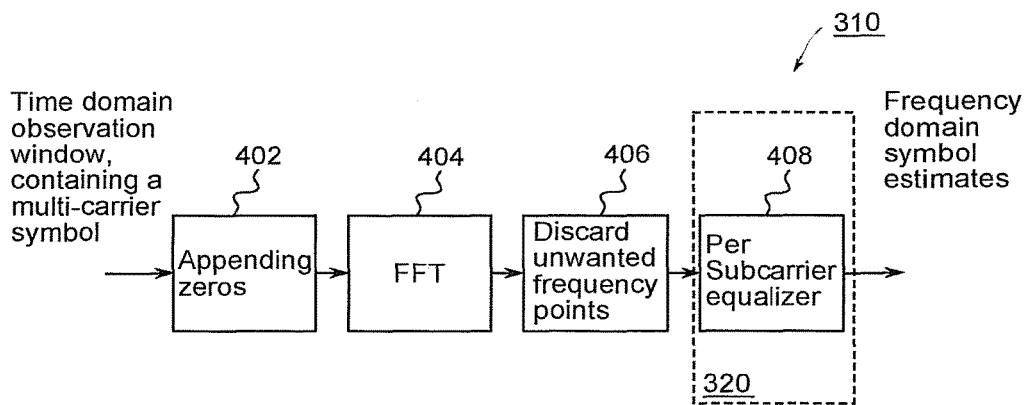
FIG. 5 illustrates a schematic block diagram of a frequency-domain UFMC receiver.

In one or more embodiments the receiver 310 may additionally or alternatively comprise a Fourier transform module which is configured to transform the received multicarrier signal y (e.g. corresponding to one symbol period) from the time domain into the frequency domain. That is to say, in one or more embodiments the receiver processing, including receive filtering, may be performed in the frequency-domain. Hence, the filter module 320 may be configured to perform at least parts of the inverse sideband suppression filter operation for the first and the at least second frequency or subcarrier block in the frequency domain. In some embodiments the Fourier transform module may be operable to apply a Fast Fourier Transform (FFT) on the received multicarrier signal y, as will be explained in the following with reference to FIG. 5.

In order to apply the FFT with a power of 2, the receive vector y according to equation (3) may be appended with zeros until the next power of 2 is reached in total length, resulting in $y_{pad}$. For example, a received UFMC signal with an N=1024 sample IDFT with a subband-filter-length of L=80, has a total multicarrier symbol duration of N+L−1=1103 time samples. The next power of 2 is 2048. Thus, 2048−1103=945 samples with zeros may be appended to y to obtain $y_{pad}$. This may be done by block 402. Then $y_{pad}$ may be transferred into frequency domain according to $$Y_{double} = \operatorname{FFT}(y_{pad}) \qquad (10)$$

by FFT module 404. The resulting frequency domain vector $Y_{double}$ has double the number of frequency sample points than required. Thus, each second sample point of $Y_{double}$ can be discarded in block 406 to obtain the frequency response $Y_{single}$ at the output of module 406. Hence, the receiver 310 may be configured to append N−L+1 zeros to a received time-domain multicarrier signal vector y of length N+L−1, with N being the length of an Inverse Discrete Fourier Transform (IDFT) performed at the transmitter 100 of the multicarrier signal and L being a length of a sideband suppression filter 106 at the transmitter 100. The receiver's Fourier transform module 404 may be configured to perform a FFT on the appended time-domain multicarrier signal vector $y_{pad}$ corresponding to a length of 2N. After the FFT 404 every second sample of the obtained frequency-domain signal vector $Y_{double}$ may be discarded.

Now after those processing steps, a per-subcarrier scalar equalizer 408 can be applied, performing an element-wise multiplication of equalizing vector q and frequency response vector $Y_{single}$ $$\hat{s} = q \circ Y_{single} \qquad (11)$$

where the circular symbol represents the Hadamard-product, carrying out the element-wise multiplication. The equalizing vector q takes care for all phase rotations caused by the frequency responses of the respective frequency block specific sideband suppression filter 106-i (i=2, . . . , p )), including the filter delay phase shifts, as well as the frequency response of the physical channel H, the so-called channel transfer function. Note that this equalization is similar to OFDM, with additional compensation of the sideband suppression filters 106-i (i=2, . . . , p )). Hence, in some embodiments the receiver's filter module 320 may comprise a per-subcarrier equalization filter 408 for equalizing, in the frequency domain and per subcarrier, a transmission channel 305 corresponding to a concatenation of a sideband suppression filter 106-i (i=2, . . . , p )) for the respective i-th frequency block and a physical communication channel for the respective i-th subcarrier between the transmitter 100 and the receiver 310.

Figure 6:
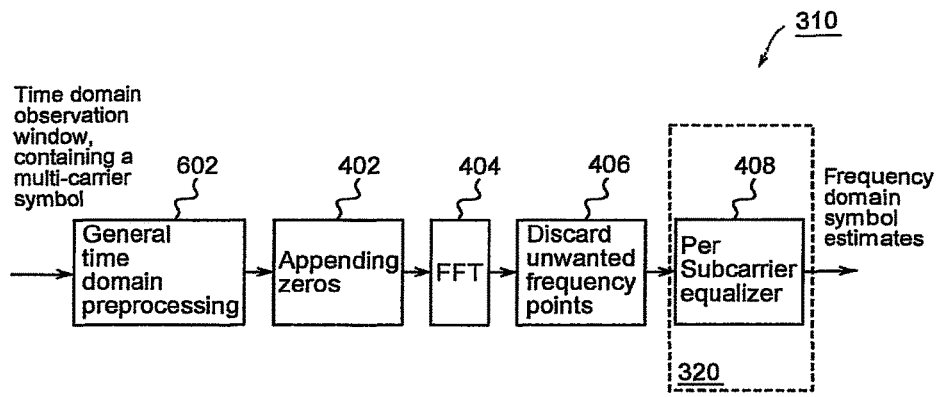
FIG. 6 illustrates a schematic block diagram of a frequency-domain UFMC receiver with time-domain pre-processing.
Figure 7:
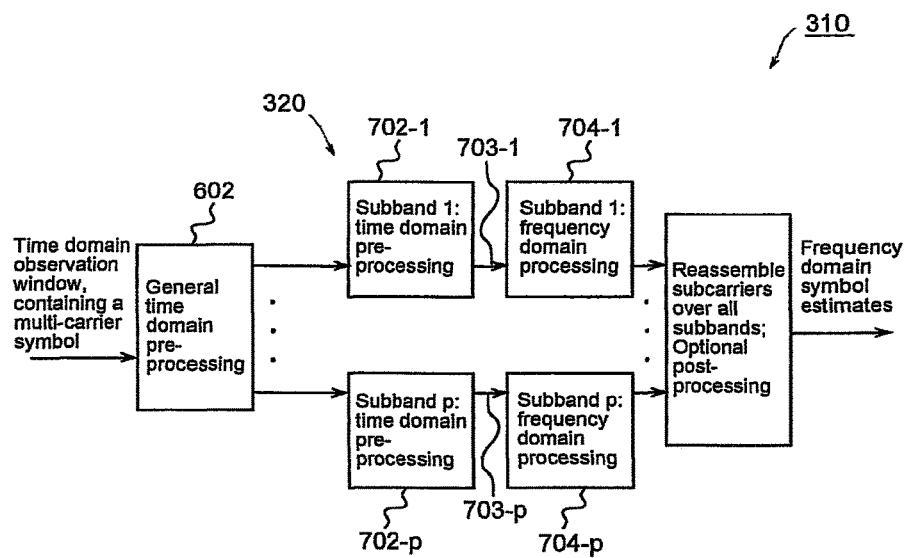
FIG. 7 illustrates a schematic block diagram of a subband-specific frequency-domain UFMC receiver with time-domain pre-processing.

In one or more embodiments, which are schematically illustrated in FIGS. 6 and 7, additional time-domain pre-processing 602 may be combined with frequency-domain processing. For example, any phase rotations caused by (sub-)carrier frequency offsets may first be pre-compensated in the time domain by module 602, for example, by element-wise multiplication of a conjugate phase factor estimate. The following processing steps or modules illustrated in FIG. 6 correspond to the embodiment of FIG. 5.

FIG. 7 schematically shows an embodiment with subsequent per-subband processing. Here, after general time-domain pre-processing 602 (e.g. phase offset compensation), per-subband receive filtering 702-1, 702-2, . . . , 702-p can be applied in the time-domain e.g. by using matched filters $G_i$ (i=1, 2, . . . , p). For example, for the first frequency block or subband filter $G_1$ (702-1) may correspond to $F_1^H$, for the second subband $G_2$ (702-2) may correspond to $F_2^H$, etc. Hence, the filter module 320 may be configured to separately filter the received multicarrier signal according to the inverse sideband suppression filter operation for the first frequency block ($F_1^H$) and according to the at least second frequency block ($F_2^H$) in the time domain to obtain first and second filtered multicarrier signals 703-1, 703-2, . . . , 703-p.

For the filter output $G_i y$ of a particular subband or frequency block i, there are several processing options.

In one embodiment, zeros may be padded to the filter output 703-1, 703-2, ..., 703-p of a particular subband until the next power of 2 is reached. This results in vector $G_i y_{pad}$, as has already been explained above. Then $G_i y_{pad}$ may be transferred into frequency domain $$Y_{i,double}^{filtered} = \text{FFT}(G_i y_{pad}) \tag{12}$$

by an FFT module. The resulting frequency domain vector $Y_{i,double}^{filtered}$ double the number of frequency sample points than required. Thus, each second sample point of $Y_{i,double}^{filtered}$ can be discarded to obtain the frequency response $Y_{1,single}^{filtered}$ at the output of module 704-i (i=1, 2, ..., p). Here, the receiver 310 is configured to separately transform the first and the at least second filtered multicarrier signals into the frequency domain and to discard subcarriers outside the respective frequency block of interest. This kind of processing may be performed for all subbands i=1, 2, ..., p and all results may be stacked in a combined vector $Y_{single}^{filtered}$. Again, per-subcarrier equalization can be carried out by $$\hat{s} = q_{pre\text{-}filtered} \circ Y_{single} \tag{13}$$

Note that $q_{pre\text{-}filtered}$ differs from q of equation (11), as it contains also the impact of the frequency response of the respective per-subband receive filters $G_i$ (i=1, 2, ..., p). The described pre-filtering can e.g. improve the per-subcarrier Signal-to-Noise Ratio (SNR). Note that if the filtering matrix is an identity matrix, meaning convolution with a Dirac impulse, this embodiment also covers the 'no filtering' embodiment of FIG. 5.

In other embodiments the result $Y_{single}^{filtered}$ may be directly produced by a DFT despreading subband-per-subband after pre-filtering with Gy. That is to say, instead of a FFT a DFT may be employed.

According to some embodiments the subband-specific receive filters $G_i$ (i=1, 2, ..., p) may additionally include a down-sampling, leading to $G_{i,down}$ (i=1, 2, ..., p), where the down-sampling rate may be tailored to the filter slopes of the transmit UFMC filters 106-i (i=1, 2, ..., p) in order to prevent aliasing. For a particular frequency block or subband i=1, 2, ..., p, the downsampled sequence $G_{i,down} y_{pad}$ may be processed with an FFT:

$$Y_{i,down}^{subband} = \text{FFT}(G_{i,down} y_{pad}) \tag{14}$$

Note that this FFT in equation (14) is much smaller in size than the FFT used in equation (12), which may reduce processing complexity.

The received UFMC multicarrier signal y may suffer from Inter-Carrier Interference (ICI) and/or Inter-Symbol Interference (ISI). This can happen e.g. when two users are received in adjacent bands, but their timing is not accurately aligned. In this case, (sub-) carriers from adjacent frequencies cross-talk into each other. For this case the receiver 310 may comprise an interference suppression module which is operable to apply a window-function to the received multicarrier signal vector y in the time domain before performing the inverse sideband suppression filter operation for the first and/or the at least second frequency block. By applying a weighting window to the time domain received signal vector y (e.g. corresponding to a multicarrier symbol), i.e., an element-wise multiplication of the receive signal with the window, e.g. leading to a smooth amplitude reduction at the symbol edges, the effect is twofold:

the interference power may be reduced,
Self-interference may be increased as the single subcarriers are convolved with the frequency response of the window.

Hence, the window-function may be applied as soon as the interference introduced due to the misalignment of the symbol timings exceeds the self-interference introduced by the windowing.

As has been explained, the received UFMC multicarrier signal y may suffer from ICI when two users are received in adjacent bands, but their timing is not accurately aligned. In this case (sub-)carriers from neighboring frequencies cross-talk into each other. This effect is, compared to OFDM, rather localized in frequency, as the side lobe levels of UFMC are much lower. So a receiver 310 according to some embodiments can estimate the symbols from those interfering bands and perform interference cancellation (parallel or serial) in order to remove inter-carrier interference. That is to say, the receiver 310 may comprise an interference cancellation module which is operable to estimate the transmitted signal corresponding to a multicarrier signal of an adjacent frequency band and to use the estimated signal for interference cancellation in the multicarrier signal of interest. For that purpose well-known parallel or serial Multi-User Detection (MUD) or joint detection concepts may be used.

In one or more embodiments the receiver 310 may also comprise means for decoding multiple signal layers in the received UFMC multicarrier signal y or the filtered first and the at least second frequency block thereof. Thereby, the multiple signal layers may correspond to different Code Division Multiple Access (CDMA) or Interleave Division Multiple Access (IDMA) layers. That is to say, each sub-carrier (i.e. each data symbol $d_{i,j}$ (i=1 ... p; j=1 ... $n_i$)) of the UFMC multicarrier signal may convey information of multiple code-division- and/or interleave-division-multiplexed users. First, the symbol estimates may be generated by one of the solutions of the aforementioned receiver embodiments. In case of multi-layer transmission (having CDMA or IDMA components), those initial symbol estimates are now the superposition of multiple signal layers. As the multicarrier transmission already has parallelized the transmission of multiple symbols and (approximately) has removed inter-symbol interference, no strategies like Rake-receivers are required.

In case of CDMA-like layers despreading can happen e.g. by forming the inner product of the receive symbols and the joint impact of spreading code c, channel transfer function h, and receive filter f, i.e.

$$r = (c \circ h \circ f)^H \hat{s} \tag{15}$$

In case of IDMA-like layers, receiver strategies like the elementary symbol estimator (ESE) as described in Li Ping; Lihai Liu; Leung, W. K., "A simple approach to nearoptimal multiuser detection: interleave-division multiple-access," IEEE WCNC 2003. March 2003, can operate on the soft-bits to decode the layers in parallel.

Prior to the described receiver processing steps, usually channel knowledge is required unless differential modulation etc. is used. UFMC can, similar to OFDM, insert pilot resource elements, e.g. scattered in time and frequency, where known transmit symbols are inserted. It may be advantageous e.g. to choose pilot symbol sequences with a Constant Amplitude, Zero Autocorrelation (CAZAC) property, so using e.g. Zadoff-Chu or Björck sequences, which may be helpful for accurate timing- and frequency estimation and synchronization. It is suggested for the pilot symbols to apply a processing chain like in embodiments of FIG.

5 or 6, thus performing frequency domain processing, optionally with time-domain pre-filtering. Exemplary for the embodiment of FIG. 5, equation (11) contains the subcarrier symbol estimates as equalized frequency response results from $Y_{single}$. Looking at a particular subcarrier n in equation (11) we get the following:

$$S_{Pilot}(n) = \hat{H}_{CTF}(n) \cdot F_{FD}(n) \cdot Y_{single}(n) \quad (16)$$

where $F_{FD}(n)$ denotes the frequency response of the relevant sideband suppression filter 106 at subcarrier n, $\hat{H}_{CTF}(n)$ denotes the channel estimate for subcarrier n, and $Y_{single}(n)$ denotes the received signal of subcarrier n in the frequency domain.

So a raw channel estimate for a single resource element can be computed based on known pilot symbol $S_{Pilot}(n)$, known filter frequency response $F_{FD}(n)$ and observed subcarrier received value $Y_{single}(n)$ according to:

$$\hat{H}_{CTF}(n) = S_{Pilot}(n)/(F_{FD}(n) \cdot Y_{single}(n)) \quad (17)$$

Hence, the receiver 310 may comprise a channel estimator which is operable to determine a subcarrier-specific estimate $\hat{H}_{CTF}(n)$ of a physical communication channel between a transmitter 100 and the receiver 310, based on a Fourier transformation $S_{Pilot}(n)$ of one or more known pilot signals comprised in the multicarrier signal, and based on the sideband suppression filter $F_{FD}(n)$ for the frequency block comprising the subcarrier n.

Compared to OFDM, a different processing (e.g. according to the embodiment of FIG. 5) was done to achieve the frequency domain receive symbol; then the impact of the filtering was additionally taken into account. After having obtained the raw channel estimate via equation (17), every subsequent processing, as known from OFDM can be applied. E.g. two-dimensional Wiener filtering in time- and frequency dimension will be identical to OFDM, in case OFDM also uses those raw channel estimates, which just compensate the impact of the pilot symbol.

The embodiments presented herein may provide efficient receiver architecture realizations for a novel universal extension of OFDM, suitable for 5G, e.g. in fragmented band operation, asynchronous systems, relaxed requirements on oscillators etc. Thus it can provide the basis of a future 5G physical layer.

In some embodiments the receiver processing can still be frequency-domain FFT-based: The receive time window gets zeros appended to the next power of two, an FFT is carried out where each second frequency value corresponds to a subcarrier main lobe. Similar to OFDM, single-tap per-subcarrier frequency domain equalizers can be used which equalize the joint impact of the radio channel and the respective subband-filter. This leads to similar complexity order as OFDM. Before performing the FFT, a time-windowing functionality may be applied. Windowing in time corresponds to a convolution in frequency domain, so the subcarriers of the user of interest are broadened accordingly. Further, out-of-band emissions of the interfering user within the pass-band of the user of interest may be attenuated. So, with a high degree of synchronization interference is worsened due to self-interference of the user of interest when applying the window, however, with relaxed time synchronicity the reduction of the inter-traffic interference is dominating resulting in an overall improved performance.

A further but more complex option is to use a time-domain (TD-) linear receiver (e.g. MMSE) which is able to suppress inter-carrier interference. An appealing compromise here is to use this TD-receiver only for a few subcarriers at the edges of allocation bands and handle most subcarriers via FFT-based FD processing.

UFMC is flexibly usable and parameterizable, e.g. there may be a user-individual filter adaptation, tailored to the large-scale propagation conditions, like delay spread.

Compared to FBMC, many of the FBMC drawbacks may be avoided with UFMC, at the price of a slightly smaller side-lobe suppression capability. So it is an interesting 5G waveform candidate technology.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, such as "a processor", "a controller", etc. as well as hardware capable of executing software in association with appropriate software. Moreover, any entity described herein as functional block, may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A receiver for receiving a wireless multicarrier signal comprising a plurality of subcarriers within a frequency band of the multicarrier signal, the receiver comprising:
   a filter module including a first frequency block specific sideband suppression filter and a second frequency block specific sideband suppression filter, said filter module being
   configured to perform an inverse sideband suppression filter operation for a first frequency block within the frequency band of the multicarrier signal, the first frequency block comprising a first group of subcarriers corresponding to at least one first physical resource block of the multicarrier signal, the first frequency block being filtered with the first frequency block specific sideband suppression filter for sideband suppression outside of said first frequency block, and
   configured to perform an inverse sideband suppression filter operation for at least a second frequency block within the frequency band of the multicarrier signal, the second frequency block comprising a second group of subcarriers corresponding to at least one second physical resource block of the multicarrier signal, the second frequency block being filtered with the second frequency block specific sideband suppression filter for sideband suppression outside of said second frequency block.

2. The receiver of claim 1, wherein the filter module is coupled to a non-linear maximum likelihood detector for detecting at least one of a first transmit signal of the first frequency block based on a plurality of filtered hypothesis of the first transmit signal and a second transmit signal of the second frequency block based on a plurality of filtered hypothesis of the second transmit signal.

3. The receiver of claim 2, wherein the non-linear maximum likelihood detector is configured to successively operate on different inverse sideband suppression filtered frequency blocks of the received multicarrier signal.

4. The receiver of claim 1, further comprising a Fourier transform module configured to transform the multicarrier signal from the time domain into the frequency domain, wherein the filter module is configured to perform the inverse sideband suppression filter operation for the first and the at least second frequency block in the frequency domain.

5. The receiver of claim 4, wherein the receiver is configured to append N−L+1 zeros to a received time-domain multicarrier signal vector of length N+L−1, with N being the length of an Inverse Discrete Fourier Transform performed at a transmitter of the multicarrier signal and L being a length of a sideband suppression filter at the transmitter,
   wherein the Fourier transform module is configured to perform a Fast Fourier Transform on the appended time-domain multicarrier signal vector corresponding to a length of 2N and, after the Fast Fourier Transform, to discard every second sample of the obtained frequency-domain signal vector.

6. The receiver of claim 4, wherein the filter module comprises a per-subcarrier equalization filter for equalizing, in the frequency domain and per subcarrier, a transmission channel corresponding to a concatenation of a sideband suppression filter operation for the respective frequency block and a physical communication channel for the respective subcarrier between the transmitter and the receiver.

7. The receiver of claim 1, wherein the filter module is configured to separately filter the multicarrier signal according to the inverse sideband suppression filter operation for the first frequency block and the at least frequency second block in the time domain to obtain first and second filtered multicarrier signals, respectively, and
   wherein the receiver further comprises a Fourier transform module configured to separately transform the first and second filtered multicarrier signals into the frequency domain and to discard subcarriers outside the respective frequency block of interest.

8. The receiver of claim 1, further comprising a channel estimator operable to determine a subcarrier-specific estimate of a physical communication channel between a transmitter and the receiver, based on a Fourier transformation of one or more known pilot signals comprised in the multicarrier signal, and based on the sideband suppression filter for the frequency block comprising the specific subcarrier.

9. A method for receiving a wireless multicarrier signal comprising a plurality of subcarriers within a frequency band of the multicarrier signal, the method comprising
   performing an inverse sideband suppression filter operation for a first frequency block within the frequency band of the multicarrier signal, the first frequency block comprising a first group of subcarriers corresponding to at least one first physical resource block of the multicarrier signal, the first frequency block being filtered with a first frequency block specific sideband suppression filter for sideband suppression outside of said first frequency block, and
   performing an inverse sideband suppression filter operation for at least a second frequency block within the frequency band of the multicarrier signal, the second frequency block comprising at least a second group of subcarriers corresponding to at least one second physical resource block of the multicarrier signal, the second frequency block being filtered with a second frequency block specific sideband suppression filter for sideband suppression outside of said second frequency block.

10. A multicarrier communication system, comprising:
    a transmitter comprising
    means for grouping subcarriers of a multicarrier signal into a first frequency block containing a first group of said subcarriers, and into at least a second frequency block containing at least a second group of said subcarriers;

first filtering means for sideband suppression outside of the first frequency block, wherein the first filtering means is configured to provide multicarrier symbols of the first frequency block with temporally soft transitions on each subcarrier of the first group, and at least second filtering means for simultaneous and separate sideband suppression outside of the at least second frequency block, wherein the second filtering means is configured to provide multicarrier symbols of the second frequency block with temporally soft transitions on each subcarrier of the second group;

a receiver comprising a filter module operable to perform an inverse sideband suppression filter operation for the first and at least the second frequency block.

* * * * *